United States Patent
Wang et al.

(10) Patent No.: US 9,930,666 B2
(45) Date of Patent: Mar. 27, 2018

(54) METHOD AND BASE STATION FOR MU-MIMO TRANSMISSION IN WIRELESS COMMUNICATION SYSTEM

(71) Applicant: NTT DoCoMo, Inc., Tokyo (JP)

(72) Inventors: Xin Wang, Beijing (CN); Xiaolin Hou, Beijing (CN); Huiling Jiang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 119 days.

(21) Appl. No.: 14/996,255

(22) Filed: Jan. 15, 2016

(65) Prior Publication Data

US 2016/0212746 A1    Jul. 21, 2016

(30) Foreign Application Priority Data

Jan. 15, 2015 (CN) .......................... 2015 1 0020860

(51) Int. Cl.
*H04W 72/04* (2009.01)
*H04B 7/0452* (2017.01)
(Continued)

(52) U.S. Cl.
CPC ...... *H04W 72/0453* (2013.01); *H04B 7/0452* (2013.01); *H04L 5/0051* (2013.01);
(Continued)

(58) Field of Classification Search
CPC . H04W 72/044; H04W 40/246; H04W 8/005; H04W 72/082; H04W 48/16;
(Continued)

(56) References Cited

U.S. PATENT DOCUMENTS

2011/0019776 A1* 1/2011 Zhang .................. H04L 5/0023
                                                          375/340
2013/0064216 A1* 3/2013 Gao ...................... H04L 5/0016
                                                          370/330
(Continued)

FOREIGN PATENT DOCUMENTS

EP          2 639 994 A2     9/2013

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP Standard; 3GPP TS 36.213, 3rd Generation Partnership Project (3GPP), vol. RAN WG1, No. V12.3.0; Sep. 26, 2014, pp. 1-212.
(Continued)

*Primary Examiner* — Jung-Jen Liu
(74) *Attorney, Agent, or Firm* — Harness, Dickey & Pierce, P.L.C.

(57) ABSTRACT

The present disclosure provides a method and base station for Multiple User-Multiple Input Multiple Output (MU-MIMO) transmission in a wireless communication system. The base station re-allocates frequency resources of a DMRS port which are allocated to N first data flows to M second data flows, wherein M is greater than N, and N first data flows may be used by N first UEs or less than N first UEs. The base station designates a DMRS port for K second UEs involved in joint scheduling according to the re-allocation result of frequency resources of a DMRS port, and sends information of the designated DMRS port via a downlink control signaling to the K second UEs, where K is lower than M or equal to M.

15 Claims, 11 Drawing Sheets

101, a base station re-allocates frequency resources of a DMRS port which are allocated to N first data flows to M second data flows 102, the base station designates a DMRS port for K second UEs involved in joint scheduling according to the re-allocation result of frequency resources of a DMRS port, and sends information of the designated DMRS port via a downlink control signaling to the K second UEs

(51) Int. Cl.
*H04W 72/12* (2009.01)
*H04L 5/00* (2006.01)
*H04L 1/18* (2006.01)

(52) U.S. Cl.
CPC ....... *H04L 5/0091* (2013.01); *H04W 72/0406* (2013.01); *H04W 72/1289* (2013.01); *H04L 1/1812* (2013.01)

(58) Field of Classification Search
CPC .............. H04W 80/04; H04W 56/002; H04W 72/1215; H04W 72/0413; H04W 84/042; H04J 11/00; H04B 15/00; Y02B 60/50; H04L 5/0073; H04L 5/0048; H04L 5/0007; H04L 5/0005
See application file for complete search history.

(56) References Cited

U.S. PATENT DOCUMENTS

| | | | |
|---|---|---|---|
| 2013/0215842 A1* | 8/2013 | Han | H04W 72/042 370/329 |
| 2013/0265955 A1 | 10/2013 | Kim et al. | |
| 2014/0241287 A1 | 8/2014 | Cheng et al. | |
| 2015/0009948 A1* | 1/2015 | Raaf | H04W 48/16 370/330 |

OTHER PUBLICATIONS

European Search Report dated Mar. 18, 2016.
European Office Action for corresponding EP Application No. 16150425.3 dated Dec. 15, 2016.
European Office Action for corresponding EP Application No. 16150425.3 dated May 18, 2017.

* cited by examiner

METHOD AND BASE STATION FOR MU-MIMO TRANSMISSION IN WIRELESS COMMUNICATION SYSTEM

CROSS-REFERENCE TO RELATED APPLICATIONS

This application claims the benefit of priority from Chinese Patent Application, No. 201510020860.6, entitled "method and base station for MU-MIMO transmission in wireless communication system" and filed on Jan. 15, 2015, the entire content of which is hereby incorporated by reference.

FIELD OF THE DISCLOSURE

The present disclosure relates to communication technologies, and more particularly to a method and base station for Multi-User Multiple Input Multiple Output (MU-MIMO) transmission in a wireless communication system.

BACKGROUND

Currently in a Long-Term Evolution-Advanced (LTE-A) system, at most 4 User Equipments (UEs) can be supported for joint scheduling. For MU-MIMO transmission, at most 4-layer transmission can be supported, and at most two data flows can be allocated to each UE. For joint scheduling, each UE is configured with its dedicated DeModulation Reference Signal (DMRS). Accordingly, 8 DMRS ports are reserved in the LTE-A system, with a corresponding number from $R_7$ to $R_{14}$, so that for SU-MIMO transmission, at most 8 layers transmission can be supported, i.e., each user can be configured with 8 data flows at most. The DMRS port is a virtual port, corresponding to a group of DMRSs. This group of DMRSs is used to demodulate data transmitted through the virtual port. In practical application, a same group of Resource Elements (REs) are multiplexed for 4 DMRS ports. For example, $R_7$, $R_8$, $R_{11}$ and $R_{13}$ are configured to use one group of REs, $R_9$, $R_{10}$, $R_{12}$ and $R_{14}$ are configured to use another group of REs. 4 DMRS ports using a same group of REs are distinguished via a 4-bit Orthogonal Cover Code (OCC). Resources allocated by a base station to multiple UEs by joint scheduling may be sent to these UEs through a downlink control signal, e.g. a Downlink Control Information (DCI) signaling. Table 1 shows values and corresponding information of an antenna port indicator in the DCI, where SCID stands for a scrambling identity of DMRS. As shown in Table 1, in the case of one codeword and the value of the antenna port indicator being 0-3, 4 UEs may be jointly scheduled with one layer for each UE; in the case of two codewords and the value of the antenna port indicator being 0-1, 2 UEs may be jointly scheduled with two layers for each UE.

TABLE 1

| Values and information of an antenna port indicator in DCI | | | |
|---|---|---|---|
| One codeword | | Two codewords | |
| Value | information | Value | information |
| 0 | One layer, port 7, SCID = 0 | 0 | Two layers, ports 7-8, SCID = 0 |
| 1 | One layer, port 7, SCID = 1 | 1 | Two layers, ports 7-8, SCID = 1 |
| 2 | One layer, port 8, SCID = 0 | 2 | Three layers, ports 7-9 |
| 3 | One layer, port 8, SCID = 1 | 3 | Four layers, ports 7-10 |
| 4 | Two layers, ports 7-8 | 4 | Five layers, ports 7-11 |
| 5 | Three layers, ports 7-9 | 5 | Six layers, ports 7-12 |
| 6 | Four layers, ports 7-10 | 6 | Seven layers, ports 7-13 |
| 7 | Reserved | 7 | Eight layers, ports 7-14 |

SUMMARY

The present disclosure provides a method and base station for MU-MIMO transmission in a wireless communication system, so as to provide more DMRS ports to support joint scheduling of more users.

In an aspect, the present disclosure provides a method for MU-MIMO transmission in a wireless communication system, comprising:

re-allocating, by a base station, frequency resources of a DeModulation Reference Signal (DMRS) port which are allocated to N first data flows to M second data flows, wherein M is greater than N, and the N first data flows are used by N first UEs or less than N first UEs;

designating, by the base station, a DMRS port for K second UEs involved in joint scheduling according to the re-allocation result of frequency resources of a DMRS port, and sending information of the designated DMRS port via a downlink control signaling to the K second UEs, where K is lower than M or equal to M.

In another aspect, the present disclosure provides a base station in a wireless communication system, comprising:

a DeModulation Reference Signal (DMRS)-port frequency resource setting module, configured to re-allocate frequency resources of a DMRS port which are allocated to N first data flows to M second data flows, wherein M is greater than N, and the N first data flows are used by N first UEs or less than N first UEs;

a DMRS port designating module, configured to designate a DMRS port for K second UEs involved in joint scheduling according to the re-allocation result of frequency resources of a DMRS port, and send information of the designated DMRS port via a downlink control signaling to the K second UEs, where K is lower than M or equal to M.

DETAILED DESCRIPTION

In order to make technical solutions and merits of the present disclosure clearer, the present disclosure will be described in detail in combination with examples and accompanying drawings.

For the high-order transmission, more users are required to be scheduled jointly, for example, the number of users is greater than 4. In this case, more DMRS ports are needed to meet the requirements of joint scheduling. In the current LTE-A system, for a regular resource block (RB), kinds of reference signals and control channels use 43%-50% REs. Hence, in the limited RB resources, and under the assumption of keeping the frame structure of the current LTE-A system unchanged, more DMRS ports and corresponding DCI format are required to support joint scheduling of more users.

Figure 1:
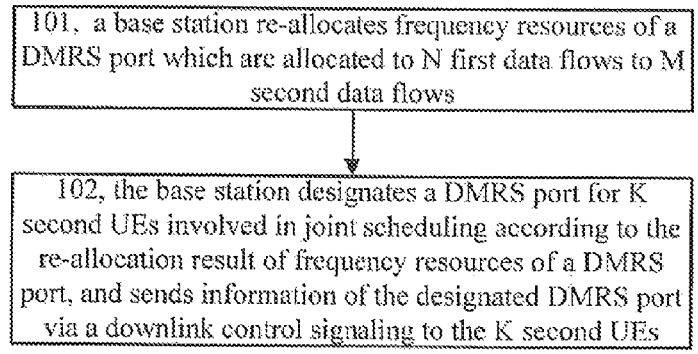
FIG. 1 is a flow chart illustrating a method for MU-MIMO transmission according to an example of the present disclosure.

FIG. 1 is a flow chart illustrating a method for MU-MIMO transmission according to an example of the present disclosure. As shown in FIG. 1, the method includes the following procedures.

In block 101, a base station re-allocates frequency resources of a DMRS port which are allocated to N first data flows to M second data flows.

M is greater than N. For example, M=w*N, where w is an integer greater than 1. N first data flows may be used by N first UEs or less than N first UEs. It should be noted that, because each UE involved in the joint scheduling may be allocated with more than one data flow, the number of first UEs is lower than N or equal to N. For example, according to Table 1, when the value of the antenna port indicator sent from the base station to a certain UE is 5, and UE determines one codeword is used from the downlink control signaling, 3 first data flows can be used by such UE.

In block 102, the base station designates a DMRS port for K second UEs involved in joint scheduling according to the re-allocation result of frequency resources of a DMRS port, and sends information of the designated DMRS port via a downlink control signaling to the K second UEs, where K is lower than M or equal to M.

In an example, N may be 4 or 8; M is equal to 2N or 3N. in an implementation, the maximum M is 24.

In an example, because M is greater than N, re-allocating frequency resources of a DMRS port which are allocated to N first data flows to M second data flows may result in that density of DMRS in frequency domain is reduced. By re-allocating REs for DMRS can increase the available DMRS ports, which may enable the system to support more UEs to be jointly scheduled.

Figure 2:
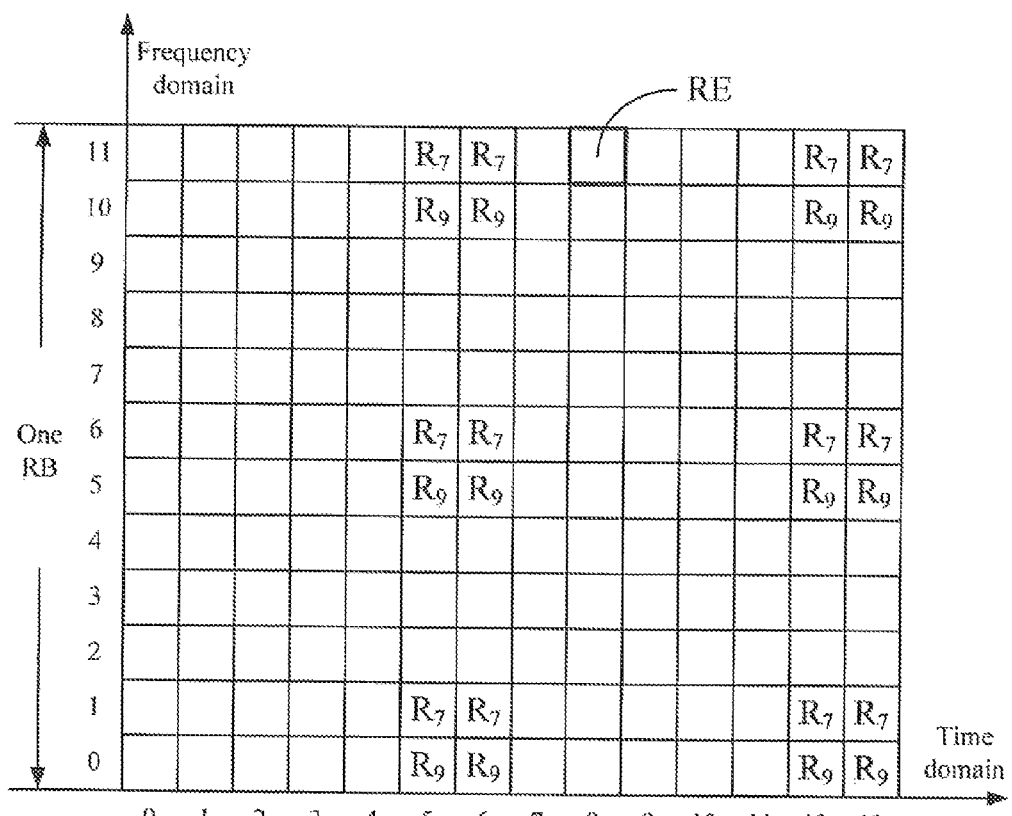
FIG. 2 is a schematic diagram illustrating resources of DMRS ports according to the prior art.

It should be noted that, a RB refer to resource combination of 14 Orthogonal Frequency Division Multiplexing (OFDM) symbols in time domain with 12 subcarriers in frequency domain, that is, one RB is composed by 14×12 REs. That is, one RE refers to resource combination of one OFDM symbol in time domain with one subcarrier in frequency domain. 14 OFDM symbols in time domain make up one Transmission Time Interval (TTI). REs in the RB may be pre-allocated to different types of references signals and control channels. The resource allocation pattern includes locations of time-frequency resources of one or more references signals (e.g., denoted by $R_0, R_1, R_2, \ldots R_7$, $R_8, R_9$, etc.) or control channels. As shown in FIG. 2, in one RB, a DMRS port 7 (denoted by $R_7$) occupies 3 subcarriers in frequency domain.

In order to meet the backward compatibility and support of mixed mode of DMRS usage for flexibility, and reduce complexity of frame structure design and rate matching procedures, without changing or using resources of other reference signals and control channels, examples of the present disclosure optimize allocation of frequency resources of DMRS ports, including re-allocating the frequency resources of DMRS ports so as to provide more DMRS ports to support more users when jointly scheduling.

Figure 3:
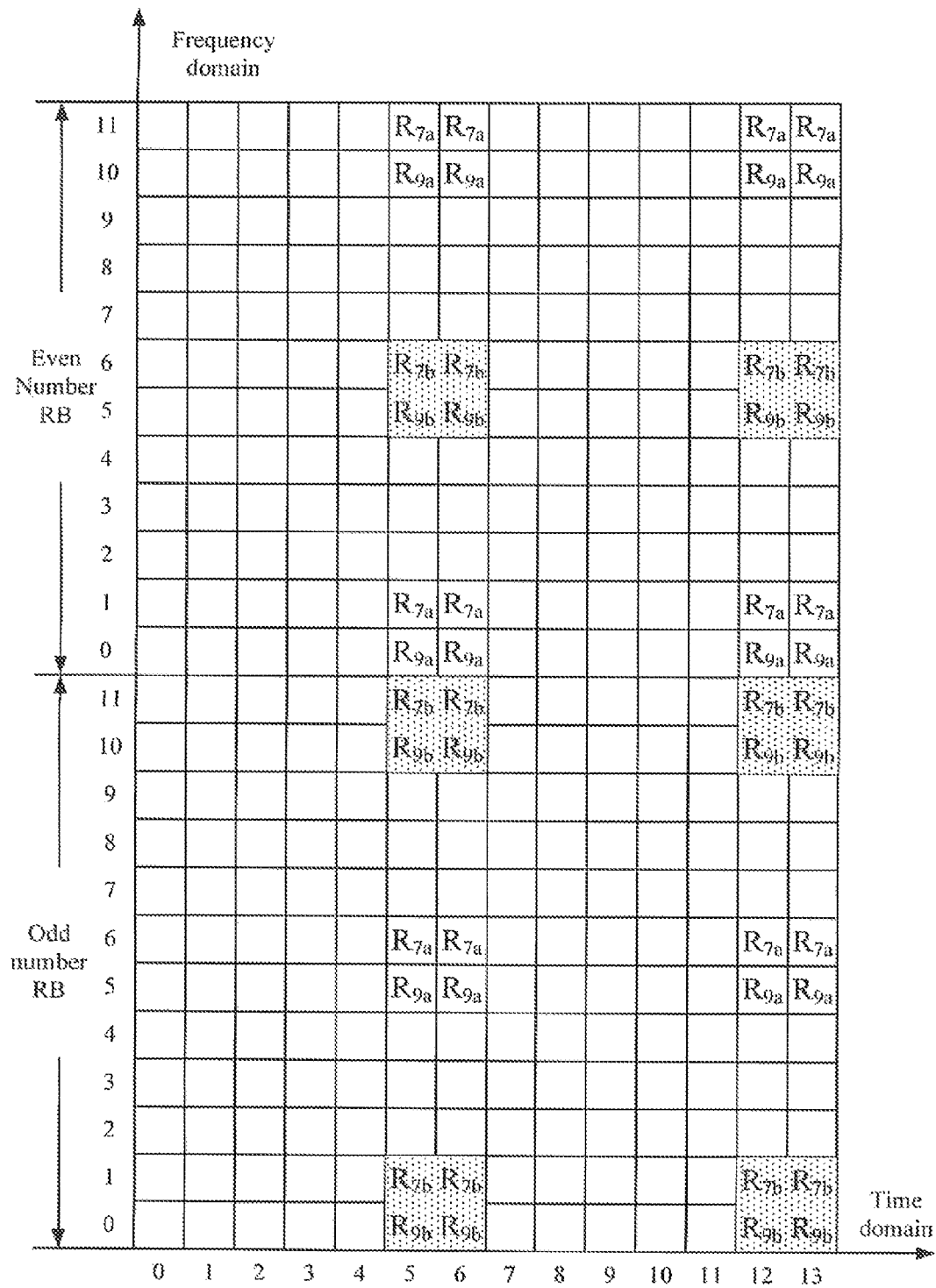
FIG. 3 is a schematic diagram illustrating resources of DMRS ports according to an example of the present disclosure.

As shown in FIG. 3, in an example, frequency resources of a DMRS port in two adjacent RBs are allocated uniformly to 2 DMRS ports. For example, frequency resources of DMRS port 7 ($R_7$) as shown in FIG. 2 are allocated to DMRS port 7a (denoted by $R_{7a}$) and DMRS port 7b (denoted by $R_{7b}$). That is, all the frequency resources of $R_{7a}$ and $R_{7b}$ are the same as the frequency resources of $R_7$.

In an example, a way of uniformly allocating refers to allocating frequency resources of DMRS port 7 ($R_7$) to DMRS port 7a (denoted by $R_{7a}$) and DMRS port 7b (denoted by $R_{7b}$) in turn, which can avoid frequency resources allocated to one DMRS port too centralized. By comparing FIG. 2 and FIG. 3, density of DMRS ports in frequency domain becomes half, and the number of the available DMRS ports becomes double, i.e., the number of users or available data flows may be double accordingly. In specific, assume that the RBs with even number and the RBs with odd number are combined together for allocation. Subcarriers allocated for $R_7$ as shown in FIG. 2 are uniformly allocated to $R_{7a}$ and $R_{7b}$. By re-allocating frequency resources across RBs, more DMRS ports can be provided to UEs. It should be noted that, allocating subcarriers of $R_7$ to $R_{7a}$ and $R_{7b}$ does not impact the resource allocation pattern of other signals or channels. For example, the resources occupation of $R_0$, $R_1$, etc. is not influenced by the above-described re-allocation.

In addition, DMRS used by $R_{7a}$ and $R_{7b}$ may be different, i.e., $R_{7a}$ and $R_{7b}$ may use two groups of DMRS, respectively. The length of DMRS sequence used by both $R_{7a}$ and $R_{7b}$ is half of that of $R_7$. For example, a Gold sequence, m-sequence, or a Zadoff Chu sequence may be used to generate a DMRS. If the length of DMRS sequence used by $R_7$ is L, the length of DMRS sequence used by both $R_{7a}$ and $R_{7b}$ is L/2.

Figure 4:
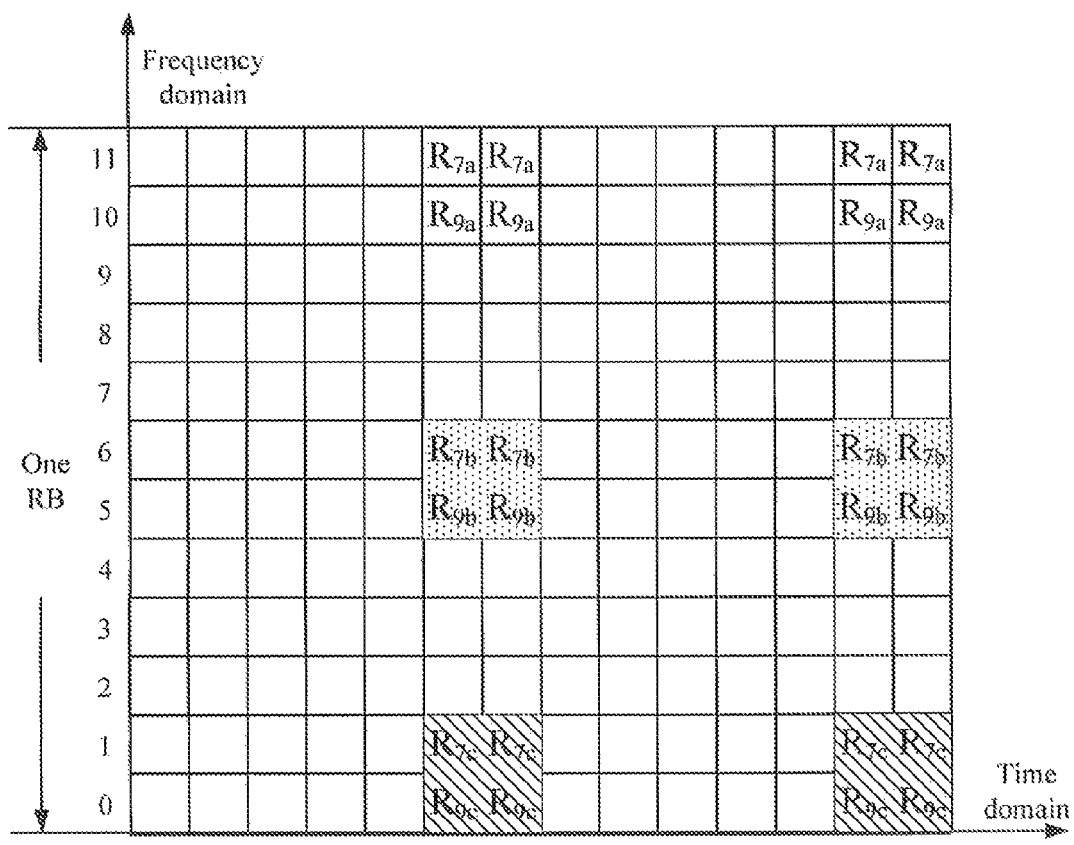
FIG. 4 is a schematic diagram illustrating resources of DMRS ports according to an example of the present disclosure.

As shown in FIG. 4, in another example, frequency resources of a DMRS port in one RB are allocated uniformly to 3 DMRS ports. For example, frequency resources of DMRS port 7 ($R_7$) as shown in FIG. 2 are allocated for DMRS port 7a ($R_{7a}$), DMRS port 7b ($R_{7b}$) and DMRS port 7c ($R_{7c}$) in turn and uniformly. That is, all the frequency resources of $R_{7a}$, $R_{7b}$ and $R_{7c}$, are the same as the frequency resources of $R_7$. Density of each DMRS port in frequency becomes ⅓, and the number of the available DMRS ports becomes triple, and the number of users may also be triple.

In this example, DMRS used by $R_{7a}$, $R_{7b}$ and $R_{7c}$, may use three groups of DMRS, respectively. The length of DMRS sequence used by $R_{7a}$, $R_{7b}$ and $R_{7c}$, respectively, is ⅓ of that of $R_7$. For example, a Gold sequence, m-sequence, or a Zadoff Chu sequence may be used to generate a DMRS. If the length of DMRS sequence used by $R_7$ is L, the length of DMRS sequence used by $R_{7a}$, $R_{7b}$ and $R_{7c}$, respectively, is L/3.

Figure 5A:
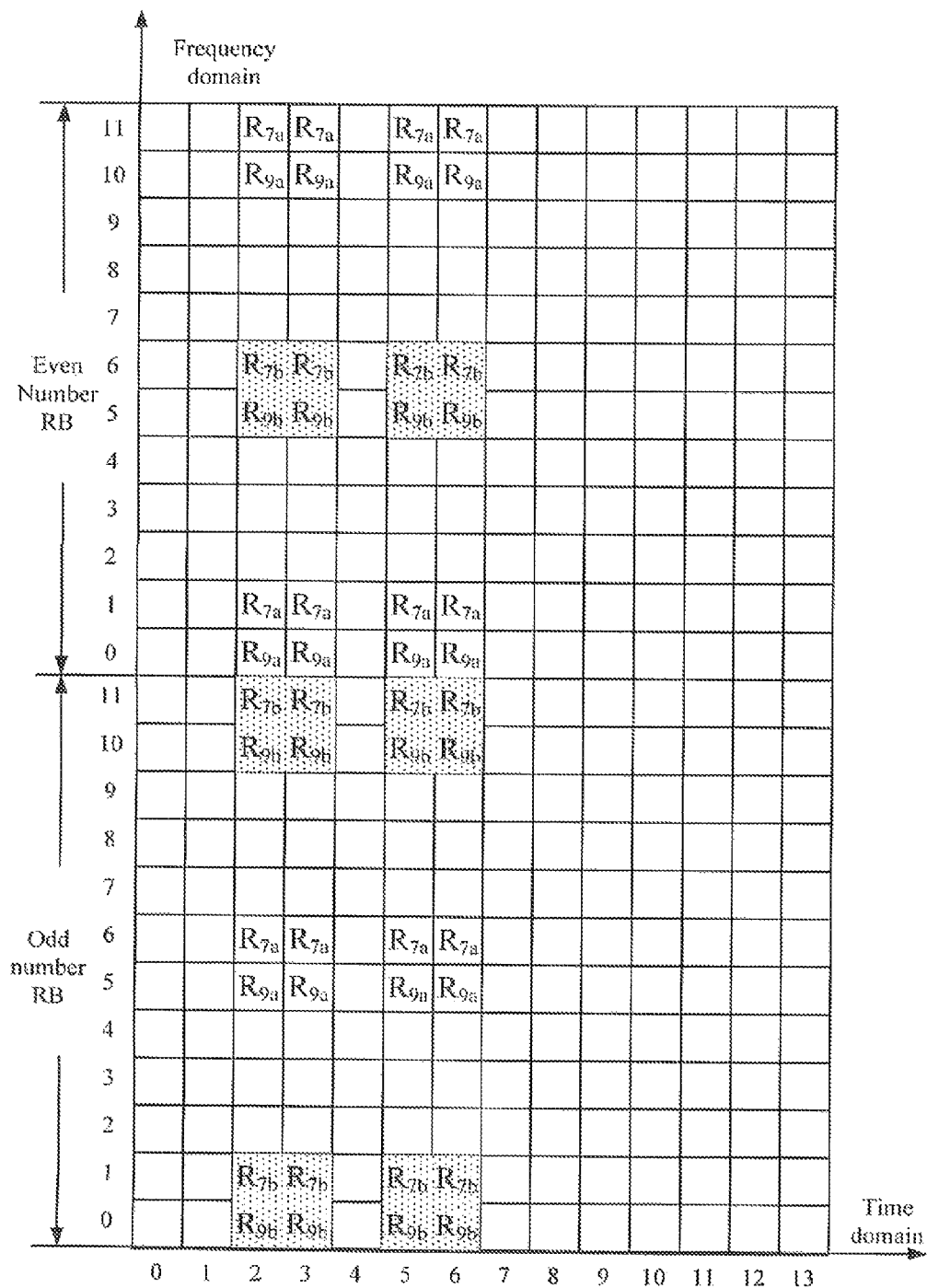
FIG. 5a is a schematic diagram illustrating resources of DMRS ports according to an example of the present disclosure.
Figure 5B:
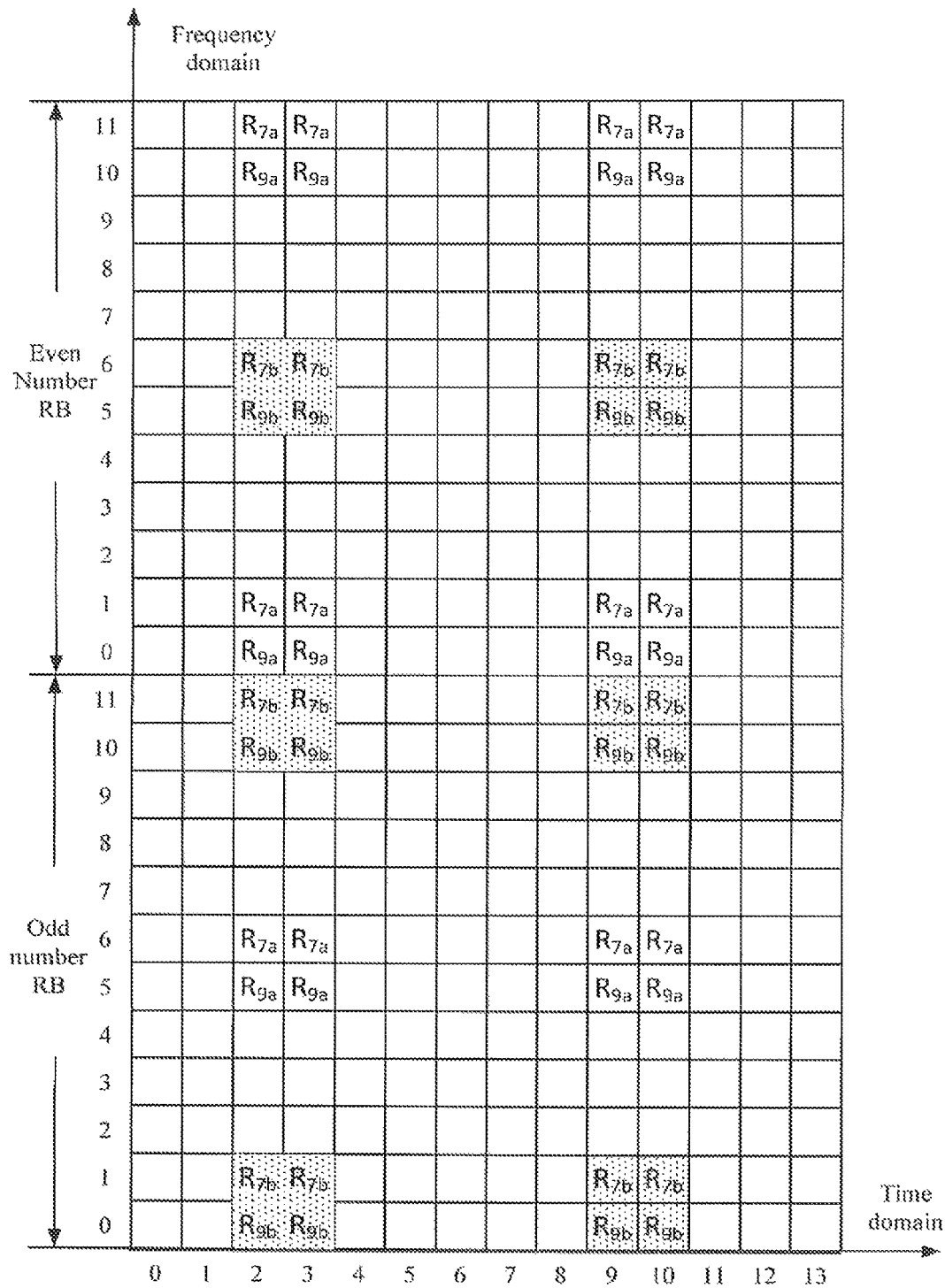
FIG. 5b is a schematic diagram illustrating resources of DMRS ports according to an example of the present disclosure.
Figure 6:
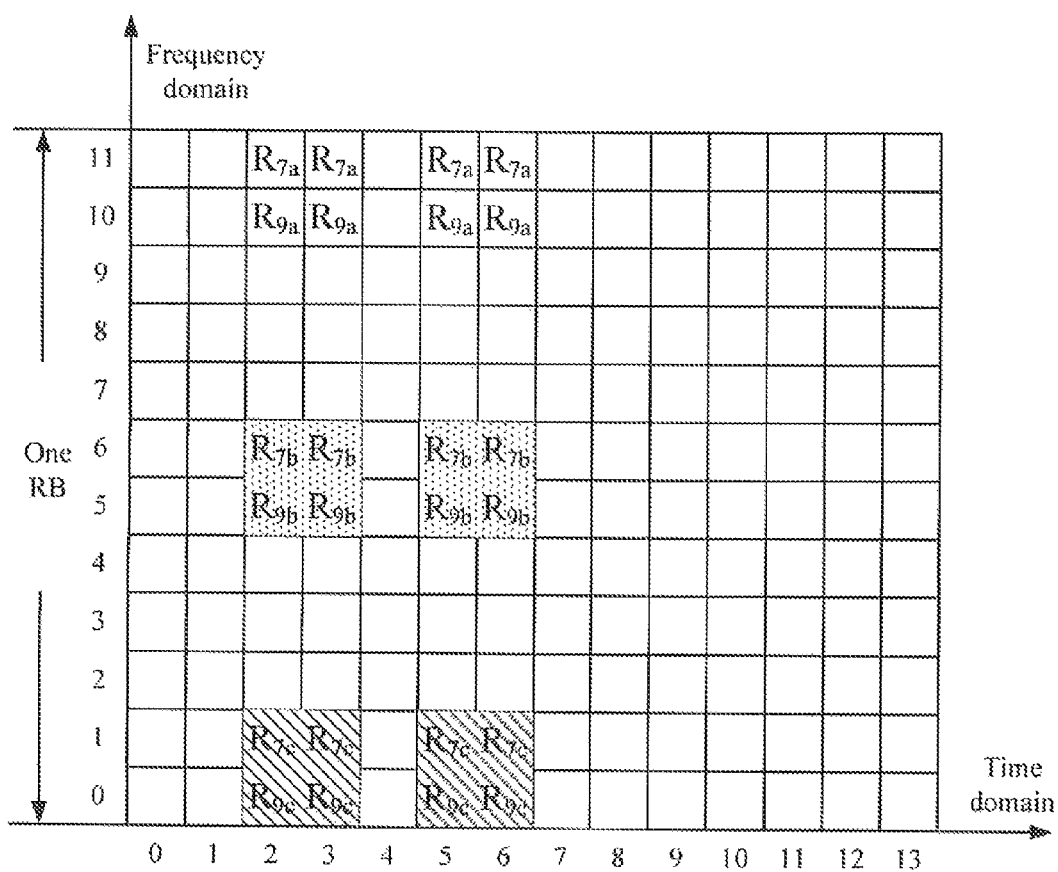
FIG. 6 is a schematic diagram illustrating resources of DMRS ports according to an example of the present disclosure.
Figure 7:
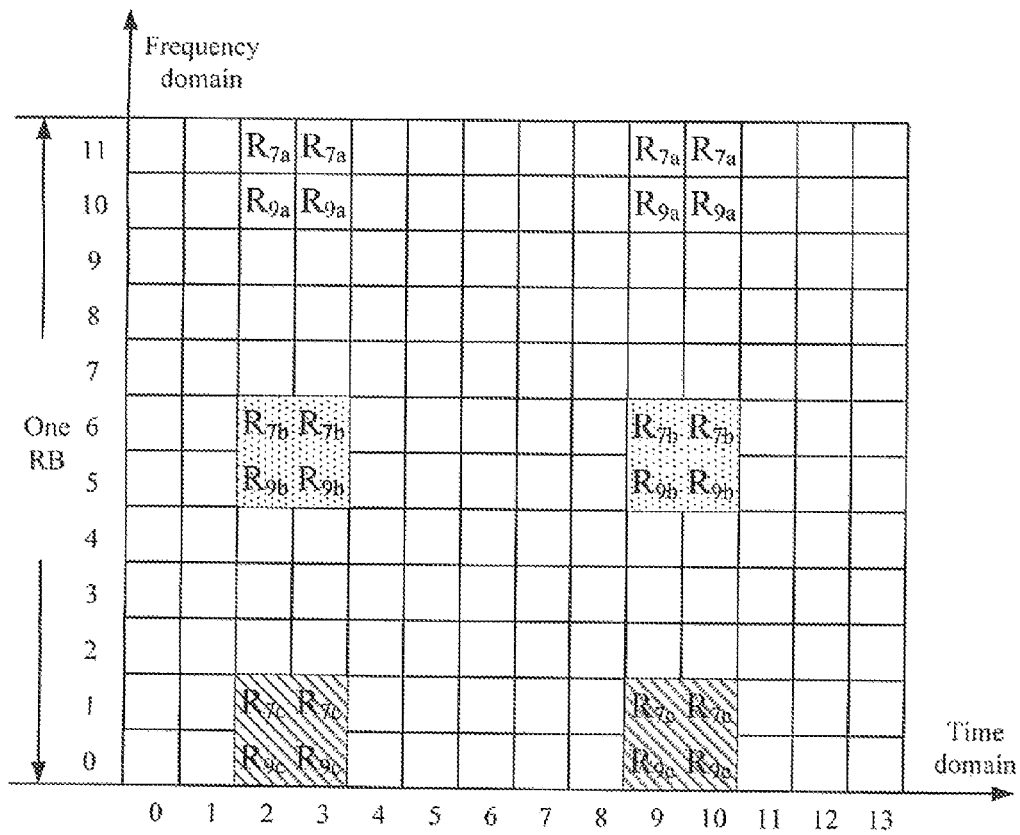
FIG. 7 is a schematic diagram illustrating resources of DMRS ports according to an example of the present disclosure.

As shown in FIGS. 2-4, for most of downlink subframes, DNRS ports allocated in time domain occupy OFDM symbols numbered as 5, 6, 12 and 13. But for some special subframes in the LTE-A system, resources in time domain of DMRS ports are different from that in FIGS. 2-4. FIG. 5a and FIG. 6 shows examples of resources of DMRS ports in special subframes, whose types are numbered as 1, 2, 6 and 7, respectively. In specific, as shown in FIG. 5a and FIG. 6, OFDM symbols, whose types are numbered as 2, 3, 5 and 6, respectively, are used for DMRS ports. FIG. 5b and FIG. 7 shows examples of resources of DMRS ports in special subframes numbered as 3, 4 and 8. In specific, as shown in FIG. 5b and FIG. 7, OFDM symbols numbered as 2, 3, 9 and 10 are used for DMRS ports.

It should be noted that, resources of DMRS ports in frequency domain as shown in FIG. 5a and FIG. 5b are similar to FIG. 3, i.e., the RBs with even number and the RBs with odd number are combined together for allocation. By re-allocating frequency resources, density of DMRS ports in frequency becomes half, and more DMRS ports can be provided to UEs. Resources of DMRS ports in frequency domain as shown in FIG. 6 and FIG. 7 are similar to FIG. 4, i.e., density of DMRS ports in frequency is reduced to ⅓.

As an example, $R_{7a}$, $R_{7b}$, $R_{7c}$, $R_{9a}$, $R_{9b}$ and $R_{9c}$ are used in FIGS. 3-7. It should be noted that, in FIG. 2, $R_8$, $R_{11}$ and $R_{13}$ use same time-frequency resources as $R_7$, and $R_{10}$, $R_{12}$ and $R_{14}$ use same time-frequency resources as $R_9$. In an example, for $R_8$, frequency resources of $R_8$ are re-allocated to $R_{8a}$ and $R_{8b}$, or re-allocated to $R_{8a}$, $R_{8b}$ and $R_{8c}$. In practical application, $R_{8a}$, $R_{11a}$ and $R_{13a}$ use a same DRMS port pattern as $R_{7a}$, i.e., $R_{8a}$, $R_{11a}$ and $R_{13a}$ use same time-frequency resources as $R_{7a}$. Similarly, $R_{8b}$, $R_{11b}$ and $R_{13b}$ use a same DRMS port pattern as $R_{7b}$, and $R_{8c}$, $R_{11c}$ and $R_{13c}$ use DRMS port pattern as $R_{7c}$. Similarly, $R_{10a}$, $R_{12a}$ and $R_{14a}$ use a same DRMS port pattern as $R_{9a}$, $R_{10b}$, $R_{12b}$ and $R_{14b}$ use a same DRMS port pattern as $R_{9b}$, $R_{10c}$, $R_{12c}$, and $R_{14c}$, use a same DRMS port pattern as $R_{9c}$. It should be noted that, in FIGS. 3-7 and the following Tables 2-3, DMRS port denoted by $R_{7a}$, $R_{7b}$ and $R_{7c}$ is only for illustration purpose. In practical application, the numbering of DMRS ports may be different based on needs.

In the above-described examples, frequency resources of N DMRS ports in two adjacent RBs are allocated uniformly to 2N DMRS ports. Or, frequency resources of N DMRS ports in one RB are allocated uniformly to 3N DMRS ports. Or, frequency resources of N DMRS ports in one RB may be allocated uniformly to 4N or more DMRS ports. Or, other methods which can decrease density of the DMRS ports in frequency domain may also be used.

When jointly scheduling, the base station designates a DMRS port for a second UE involved in joint scheduling according to the re-allocation result of frequency resources of a DMRS port, and sends information of the designated DMRS port via a downlink control signaling to the K second UEs. In an example, the downlink control signaling carries an antenna port indicator which includes more than 3 bits to indicate the DMRS port allocated to the second UE. In an implementation, an antenna port indicator with 4 bits, 5 bits or 6 bits are carried in the downlink control signaling. The downlink control signaling may be a DCI.

Figure 8:
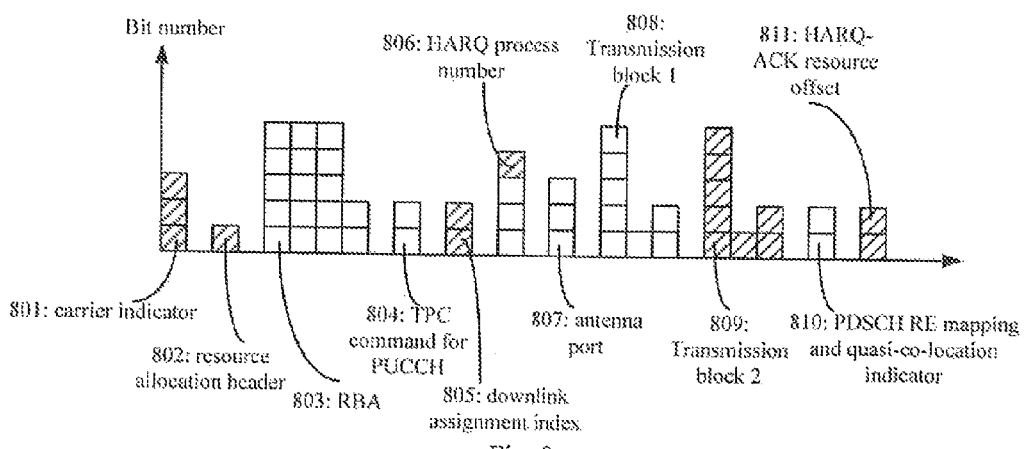
FIG. 8 is a schematic diagram illustrating DCI format according to the prior art.

In an example, a DCI format shown in FIG. 8 includes the following 11 fields, i.e., a carrier indicator 801, a resource allocation header 802, a RB assignment (RBA) 803, a Transmit Power Control (TPC) command for Physical Uplink Control Channel (PUCCH) 804, a downlink assignment index 805, a Hybrid automatic repeat request (HARQ) process number 806, an antenna port 807, a transmission block 1 808, a transmission block 2 809, a Physical Downlink Shared Channel (PDSCH) RE mapping and quasi-colocation indicator 810, and a HARQ-ACK resource offset 811. In an implementation, length of DCI is 52-bit, where the carrier indicator 801, the resource allocation header 802, the downlink assignment index 805, one of bits included in HARQ process number 806, the transmission block 2 809 and the HARQ-ACK resource offset 811 are optional, which are illustrated in FIG. 8 via slash padding. DCI is an information sequence including each field shown in FIG. 8. In the horizontal axis, the order of all fields in the DCI is shown. Each field includes a specified number of bits. For example, the carrier indicator 801 includes 3 bits. In an implementation, the order of all fields does not impact the function of the DCI. A different order from that shown in FIG. 8 may be used to generate a DCI. But it is required that the transmitter and the receiver should record the same order in order to correctly parse desired information.

Figure 9:
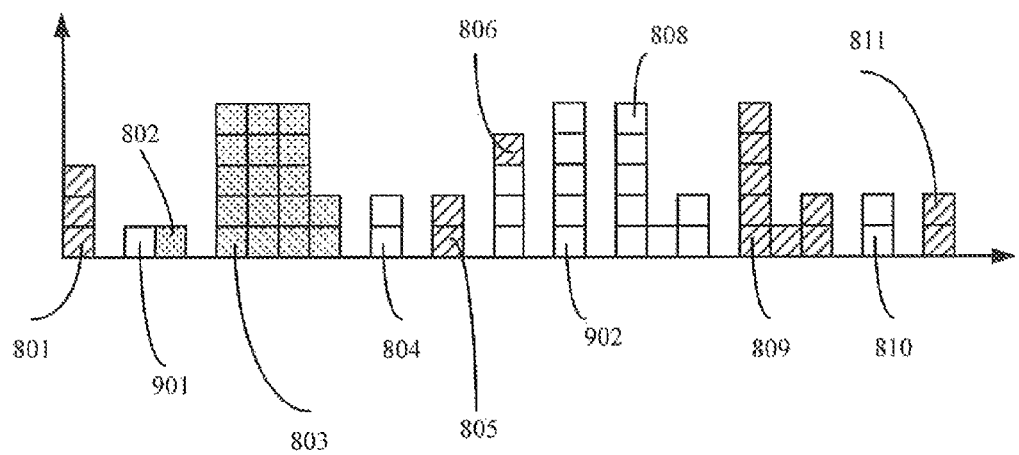
FIG. 9 is a schematic diagram illustrating DCI format according to an example of the present disclosure.

FIG. 9 is a schematic diagram illustrating DCI format according to an example of the present disclosure. Different from FIG. 8, in FIG. 9, a 1-bit wideband mode indicator 901 is added, and a 3-bit antenna port 807 is modified as a 5-bit antenna port 902. By setting a wideband mode indicator 901, a resource allocation header 802 (including 1 bit) and a RBA 803 (including 17 bits) are turned off, which are illustrated in FIG. 9 via dot padding. For example, when the value of wideband mode indicator 901 is 1, it indicates that the system uses a broadband scheduling mode, and the resource allocation header 802 and the RBA 803 are not carried in the DCI. That is, the base station does not need to transmit the resource allocation header 802 and the RBA 803 to UE, so that signaling overhead is saved. The length of DCI in FIG. 9 is 37-bit. When the value of wideband mode indicator 901 is 0, it indicates that the system uses a subband scheduling mode, which is compatible with the DCI as shown in FIG. 8.

Figure 10:
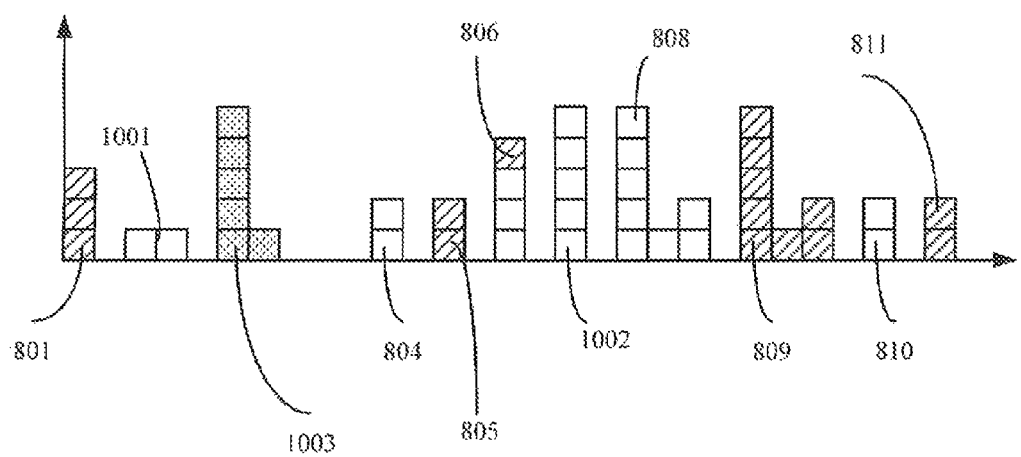
FIG. 10 is a schematic diagram illustrating DCI format according to an example of the present disclosure.

FIG. 10 is a schematic diagram illustrating DCI format according to an example of the present disclosure, where optional bits are shown via slash padding. Different from FIG. 8, in FIG. 10, a 2-bit wideband mode indicator 1001 is added, a 3-bit antenna port 807 is modified as a 5-bit antenna port 1002, a 1-bit resource allocation header 802 is deleted, and number of bits included in RBA 1003 (shown in FIG. 10 via dot padding) is reduced.

It should be noted that, values of the 5-bit antenna port indicator in FIG. 9 and FIG. 10 are shown in Table 2. For example, when one codeword is used, a UE can determine from the DCI that the value of the antenna port indicator is 23, UE may transmit two data flows, and use DMRS ports 7a and 8a, respectively.

TABLE 2

Values and information of the 5-bit antenna port indicator in DCI

| One codeword | | Two codewords | |
|---|---|---|---|
| Value | Information | Value | Information |
| 0-6 | Same as specification of LTE-A | 0-7 | Same as specification of LTE-A |
| 7 | One layer, port 7a | 8 | Two layers, ports 7a, 8a |
| 8 | One layer, port 8a | 9 | Two layers, ports 9a, 10a |
| 9 | One layer, port 9a | 10 | Two layers, ports 11a, 13a |
| 10 | One layer, port 10a | 11 | Two layers, ports 12a, 14a |
| 11 | One layer, port 11a | 12 | Two layers, ports 7b, 8b |
| 12 | One layer, port 12a | 13 | Two layers, ports 9b, 10b |
| 13 | One layer, port 13a | 14 | Two layers, ports 11b, 13b |
| 14 | One layer, port 14a | 15 | Two layers, ports 12b, 14b |
| 15 | One layer, port 7b | 16 | Three layers, ports 7a, 8a, 9a |
| 16 | One layer, port 8b | 17 | Three layers, ports 11a, 12a, 13a |
| 17 | One layer, port 9b | 18 | Three layers, ports 7b, 8b, 9b |
| 18 | One layer, port 10b | 19 | Three layers, ports 11b, 12b, 13b |
| 19 | One layer, port 11b | 20 | Four layers, ports 7a, 8a, 9a, 10a |
| 20 | One layer, port 12b | 21 | Four layers, ports 11a, 12a, 13a, 14a |
| 21 | One layer, port 13b | 22 | Four layers, ports 7b, 8b, 9b, 10b |
| 22 | One layer, port 14b | 23 | Four layers, ports 11b, 12b, 13b, 14b |
| 23 | Two layers, ports 7a, 8a | 24-31 | Reserved |
| 24 | Two layers, ports 9a, 10a | | |
| 25 | Two layers, ports 11a, 13a | | |
| 26 | Two layers, ports 12a, 14a | | |
| 27 | Two layers, ports 7b, 8b | | |
| 28 | Two layers, ports 9b, 10b | | |
| 29 | Two layers, ports 11b, 13b | | |
| 30 | Two layers, ports 12b, 14b | | |
| 31 | Reserved | | |

Figure 11:
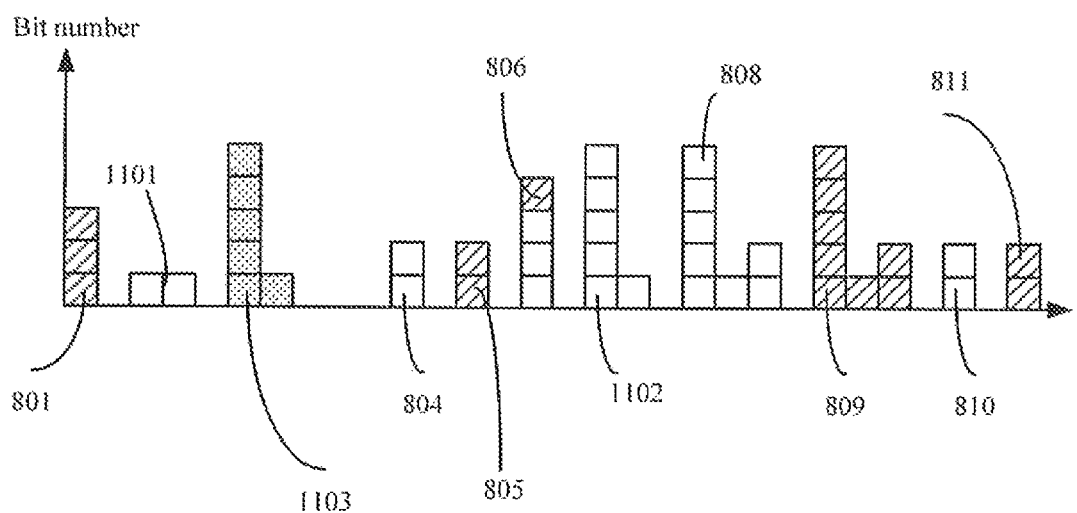
FIG. 11 is a schematic diagram illustrating DCI format according to an example of the present disclosure.

FIG. 11 is a schematic diagram illustrating DCI format according to an example of the present disclosure, where optional bits are shown via slash padding. Different from FIG. 8, in FIG. 11, a wideband mode indicator 1101 is added, 3-bit antenna port 807 is modified as 6-bit antenna port 1102, 1-bit resource allocation header 802 is deleted, and number of bits in RBA (which can be turned off) 1003 (shown in FIG. 10 via dot padding) is reduced. In an example, the wideband mode indicator 1101 includes 2 bits. When the value of wideband mode indicator 1101 is "0x", a subband allocation scheme is used, i.e., current resource allocation mode is not changed; when the value of the wideband mode indicator 1101 is "10", a fullband allocation scheme is used, i.e., RBA is not provided; when the value of wideband mode indicator 1101 is "10", a broadband allocation scheme is used, bits of RBA is reduced. Table 3 shows values of the 6-bit antenna port indicator.

TABLE 3

Values and information of the 6-bit antenna port indicator in DCI

| One codeword | | Two codewords | |
|---|---|---|---|
| Value | Information | Value | Information |
| 0 | One layer, port 7a | 0 | Two layers, ports 7a, 8a |
| 1 | One layer, port 8a | 1 | Two layers, ports 9a, 10a |
| 2 | One layer, port 9a | 2 | Two layers, ports 11a, 12a |
| 3 | One layer, port 10a | 3 | Two layers, ports 13a, 14a |
| 4 | One layer, port 11a | 4 | Two layers, ports 7b, 8b |
| 5 | One layer, port 12a | 5 | Two layers, ports 9b, 10b |
| 6 | One layer, port 13a | 6 | Two layers, ports 11b, 12b |
| 7 | One layer, port 14a | 7 | Two layers, ports 13b, 14b |
| 8 | One layer, port 7b | 8 | Two layers, ports 7c, 8c |
| 9 | One layer, port 8b | 9 | Two layers, ports 9c, 10c |
| 10 | One layer, port 9b | 10 | Two layers, ports 11c, 12c |
| 11 | One layer, port 10b | 11 | Two layers, ports 13c, 14c |
| 12 | One layer, port 11b | 12 | Three layers, ports 7a, 8a, 9a |
| 13 | One layer, port 12b | 13 | Three layers, ports 11a, 12a, 13a |
| 14 | One layer, port 13b | 14 | Three layers, ports 7b, 8b, 9b |
| 15 | One layer, port 14b | 15 | Three layers, ports 11b, 12b, 13b |
| 16 | One layer, port 7c | 16 | Three layers, ports 7c, 8c, 9c |
| 17 | One layer, port 8c | 17 | Three layers, ports 11c, 12c, 13c |
| 18 | One layer, port 9c | 18 | Four layers, ports 7a, 8a, 9a, 10a |
| 19 | One layer, port 10c | 19 | Four layers, ports 11a, 12a, 13a, 14a |
| 20 | One layer, port 11c | 20 | Four layers, ports 7b, 8b, 9b, 10b |
| 21 | One layer, port 12c | 21 | Four layers, ports 11b, 12b, 13b, 14b |
| 22 | One layer, port 13c | 22 | Four layers, ports 7c, 8c, 9c, 10c |
| 23 | One layer, port 14c | 23 | Four layers, ports 11c, 12c, 13c, 14c |
| 24 | Two layers, ports 7a, 8a | 24-63 | Reserved |
| 25 | Two layers, ports 9a, 10a | | |
| 26 | Two layers, ports 11a, 12a | | |
| 27 | Two layers, ports 13a, 14a | | |
| 28 | Two layers, ports 7b, 8b | | |
| 29 | Two layers, ports 9b, 10b | | |
| 30 | Two layers, ports 11b, 12b | | |
| 31 | Two layers, ports 13b, 14b | | |
| 32 | Two layers, ports 7c, 8c | | |
| 33 | Two layers, ports 9c, 10c | | |
| 34 | Two layers, ports 11c, 12c | | |
| 35 | Two layers, ports 13c, 14c | | |
| 36-63 | Reserved | | |

From FIGS. 9-11 and Tables 2-3, it can be seen that the antenna port indicator increases from 3 bits to 5 or 6 bits to identify more DMRS ports and support more users in joint scheduling.

In an example, DCI may also carry a 4-bit antenna port indicator, which is suitable for user numbers more than 4 but less than or equal to 8. In this case, it just needs to extend the antenna port in DCI format to 4 bits, but not needs to extend number of DMRS ports, and the DMRS port pattern shown in FIG. 2 may be used. Correspondingly, Table 4 shows values and information of the 4-bit antenna port indicator.

TABLE 4

Values and information of the 4-bit antenna port indicator in DCI

| One codeword | | Two codewords | |
|---|---|---|---|
| Value | Information | Value | Information |
| 0-6 | Same as specification of LTE-A | 0-7 | Same as specification of LTE-A |
| 7 | One layer, port 9, SCID = 0 | 8 | Two layers, ports 9-10, SCID = 0 |
| 8 | One layer, port 9, SCID = 1 | 9 | Two layers, ports 9-10, SCID = 1 |
| 9 | One layer, port 10, SCID = 0 | 10 | Two layers, ports 11, 13 |
| 10 | One layer, port 10, SCID = 1 | 11 | Two layers, ports 12, 14 |
| 11 | One layer, port 11 | 12-15 | Reserved |
| 12 | One layer, port 12 | | |
| 13 | One layer, port 13 | | |
| 14 | One layer, port 14 | | |
| 15 | Reserved | | |

In an example of the present disclosure, the base station adds a wideband mode indicator in the downlink control signaling in order to indicate a resource allocation mode to UE. The resource allocation mode may be selected from a subband scheduling mode, a broadband scheduling mode, or a fullband scheduling mode. For the subband scheduling mode, resources are allocated in unit of subband; for the broadband scheduling mode, resources are allocated in unit of broadband; for the fullband scheduling mode, resources are allocated in unit of entire frequency resources. The broadband at least includes 2 subbands, and the entire frequency resources at least are divided into 2 broadbands. When the wideband mode indicator indicates the fullband scheduling mode, RBA field is not carried; when the wideband mode indicator indicates the broadband scheduling mode, RBA field is shortened.

For a high-order MU-MIMO communication scenario (for example, the user number is greater than 4), when the number of antenna increases (for example, a massive MIMO is used), the channel state tends to be not changed, multiple consecutive subbands may be allocated to one UE, i.e., channel hardening effect occurs. For this case, the broadband or full band based scheduling may be used for downlink transmission rather than subband based scheduling. The base station may use the wideband mode indicator to notify UE the broadband scheduling mode or fullband scheduling mode to be used, so as to reduce the overhead of bandwidth allocation.

It should be noted that, for the subband scheduling mode, bit number of the resource block allocation field $N_{RBG}$ is related to the system bandwidth. As shown in Table 5, P stands for the length of Resource Block Group (RBG). In an implementation, base station and UE may agree with the length of RBG in advance. In another implementation, the length of RBG may be informed to UE by a Radio Resource Control (RRC) signaling. Then, UE may determine the size of subband or broadband from the length of RBG.

TABLE 5

Relationship between system bandwidth and length of RBG

| System bandwidth (denoted by number of RBs $N_{RB}^{DL}$) | Length of RBG (P) |
|---|---|
| ≤10 | 1 |
| 11-26 | 2 |
| 27-63 | 3 |
| 64-110 | 4 |

For example, when the system bandwidth is 10 MHz, the number of RBs corresponding to the system bandwidth is $N_{RB}^{DL}=50$, i.e., the system bandwidth includes 50 RBs. As shown in Table 5, 50 RBs correspond to P=3, then it is determined that the bit number of the resource block allocation field $N_{RBG}=17$ according to the expression $N_{RBG}=\lceil N_{RB}^{DL}/P \rceil$, where $\lceil . \rceil$ stands for rounding up to the nearest integer. As shown in FIG. 8, the resource block allocation field 803 is represented by 17 bits.

In an example, for the wideband scheduling mode, bit number of resource block allocation field 1003 or 1103 may be determined according to Table 6 or Table 7. In detail, when $N_{RB}^{DL}=50$, which falls in the range of $N_{RB}^{DL}=27-63$, P is 6 according to Table 6. Then, it is calculated that $N_{RBG}=9$ according to the expression $N_{RBG}=\lceil N_{RB}^{DL}/P \rceil$. Similarly, it is determined that $N_{RBG}=6$ according to Table 7 (as shown in FIG. 10 or FIG. 11). For the fullband scheduling mode, the resource block allocation field 1003 or 1103 can be directly turned off. In an implementation, information in Table 6 or Table 7 may be stored in the base station in advance.

TABLE 6

Relationship between system bandwidth and length of RBG

| System bandwidth (denoted by number of RBs $N_{RB}^{DL}$) | Length of RBG (P) |
|---|---|
| ≤10 | 2 |
| 11-26 | 4 |
| 27-63 | 6 |
| 64-110 | 8 |

TABLE 7

Relationship between system bandwidth and length of RBG

| System bandwidth (denoted by number of RBs $N_{RB}^{DL}$) | Length of RBG (P) |
|---|---|
| ≤10 | 3 |
| 11-26 | 6 |
| 27-63 | 9 |
| 64-110 | 12 |

Figure 12:
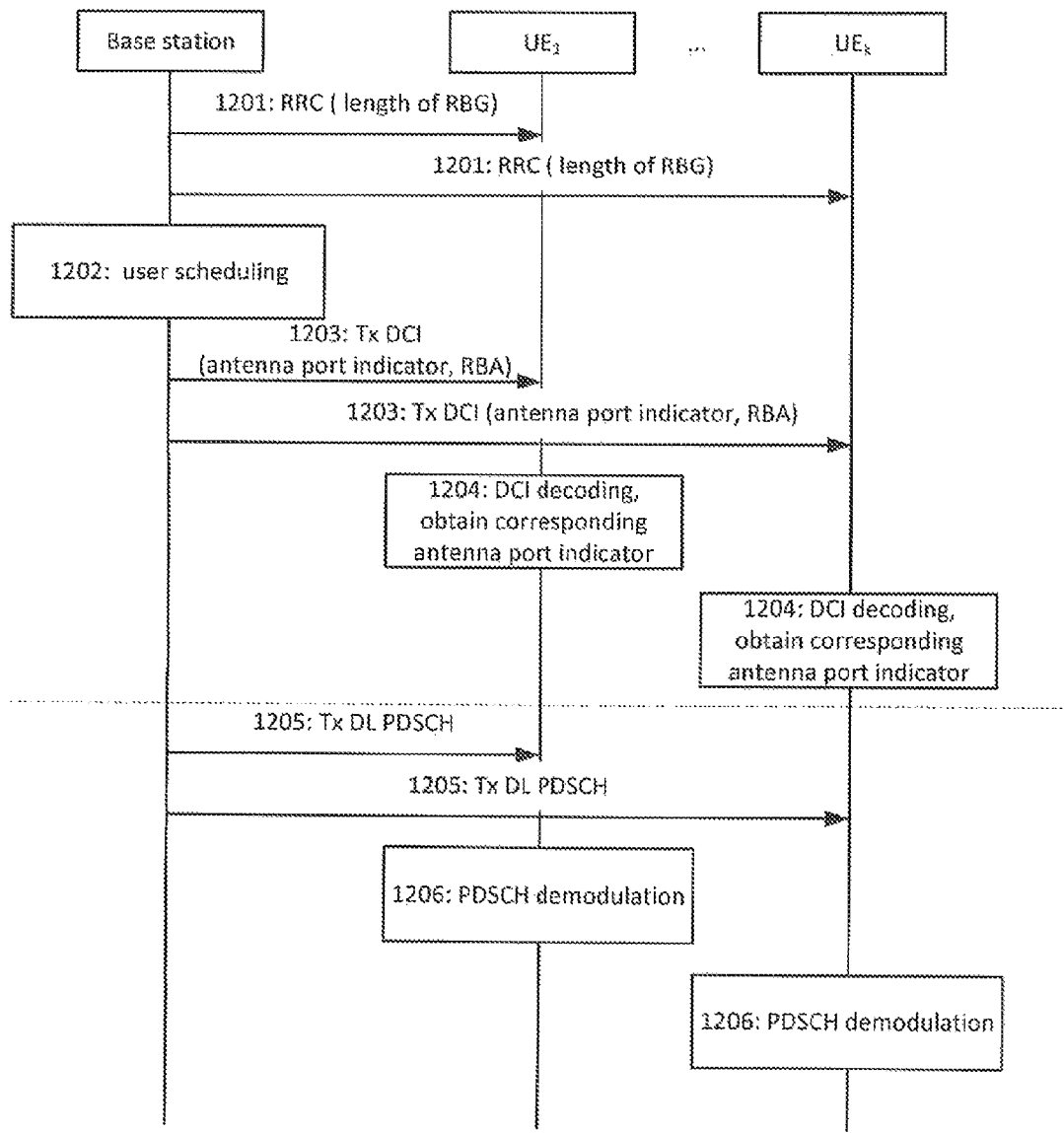
FIG. 12 is a schematic diagram illustrating signaling of wireless access network according to an example of the present disclosure.

FIG. 12 is a schematic diagram illustrating signaling of wireless access network according to an example of the present disclosure. As shown in FIG. 12, in the wireless access network, eNB sends a RRC signaling carrying length of RBG to K UEs involved in the joint scheduling (step 1201). After users are scheduled (step 1202), eNB sends a transmitter (Tx) DCI carrying information including antenna port and resource allocation etc. to K UEs (step 1203). In an implementation, K UEs involved in the joint scheduling includes: $UE_1, \ldots UE_K$. eNB sends a corresponding Tx DCI to each UE involved in the joint scheduling. The Tx DCI carries the corresponding antenna port indicator and RBA. Each of the above-described K UEs may perform DCI decoding for the received Tx DCI to obtain the corresponding antenna port indicator (step 1204). Then, eNB sends a Tx DL PDSCH signaling to the above-described K UEs (step 1205). $UE_1, \ldots UE_K$ perform PDSCH demodulation respectively after the Tx DL PDSCH signaling is received (step 1206).

Figure 13:
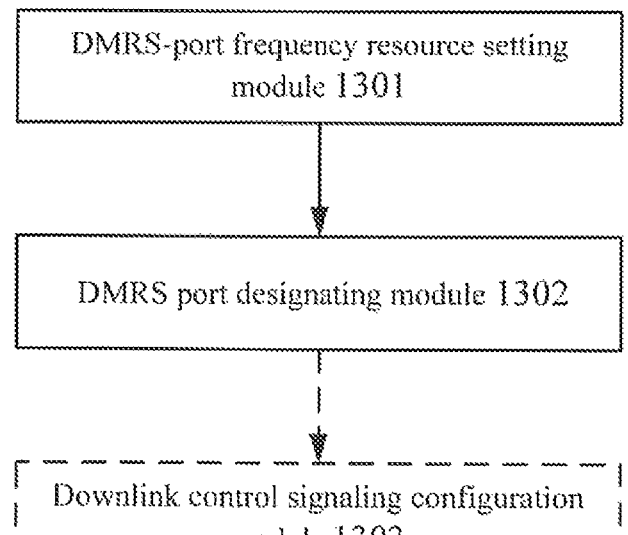
FIG. 13 is a schematic diagram illustrating a structure of a base station according to an example of the present disclosure.

FIG. 13 is a schematic diagram illustrating a structure of a base station according to an example of the present disclosure. The base station includes: a DMRS-port frequency resource setting module 1301 and a DMRS port designating module 1302. In an example, the DMRS-port frequency resource setting module 1301 is configured to re-allocate frequency resources of a DMRS port which are allocated to N first data flows to M second data flows, wherein M is greater than N, the N first data flows are used by N first UEs or less than N first UEs. The DMRS port designating module 1302 is configured to designate a DMRS port for K second UEs involved in joint scheduling according to the re-allocation result of frequency resources of a DMRS port, and send information of the designated DMRS port via a downlink control signaling to the K second UEs, where K is lower than M or equal to M. in an implementation, the DMRS-port frequency resource setting module 1301 stores the re-allocation result of frequency resources of a DMRS port, as shown in FIGS. 3-7 to enable the DMRS port designating module 1302 to perform joint scheduling.

In an example, the DMRS-port frequency resource setting module 1301 is configured to allocate frequency resources of N DMRS ports in two adjacent resource blocks uniformly to 2N DMRS ports.

In an example, the DMRS-port frequency resource setting module 1301 is configured to allocate frequency resources of N DMRS ports in two adjacent resource blocks uniformly to 3N DMRS ports.

In an example, the base station further comprises: a downlink control signaling configuration module 1303, configured to carry an antenna port indicator which comprises more than 3 bits in the downlink control signaling. In specific, the antenna port indicator is used to indicate the K second UEs the designated DMRS port. In an implementation, the downlink control signaling configuration module 1303 generates a downlink control signaling according to the information of the DMRS port allocated by the DMRS port designating module 1302.

In an example, the downlink control signaling configuration module 1303 is further configured to: add a wideband mode indicator in the downlink control signaling. The wideband mode indicator is used to indicate the second UE a resource allocation mode, wherein the resource allocation mode is selected from a subband scheduling mode, a broadband scheduling mode, and a fullband scheduling mode. In specific, for the subband scheduling mode, resources are allocated in unit of subband; for the broadband scheduling mode, resources are allocated in unit of broadband; for the fullband scheduling mode, resources are allocated in unit of entire frequency resources.

In an implementation, the DMRS-port frequency resource setting module 1301 may be configured in a scheduler of the base station. The DMRS port designating module 1302 may also be implemented in the scheduler, or configured as a single functional module in the base station. The downlink control signaling configuration module 1303 may be implemented by using a functional module of generating downlink control signaling in the base station, which may generate a corresponding signaling according to the scheduling result provided by the scheduler.

Figure 14:
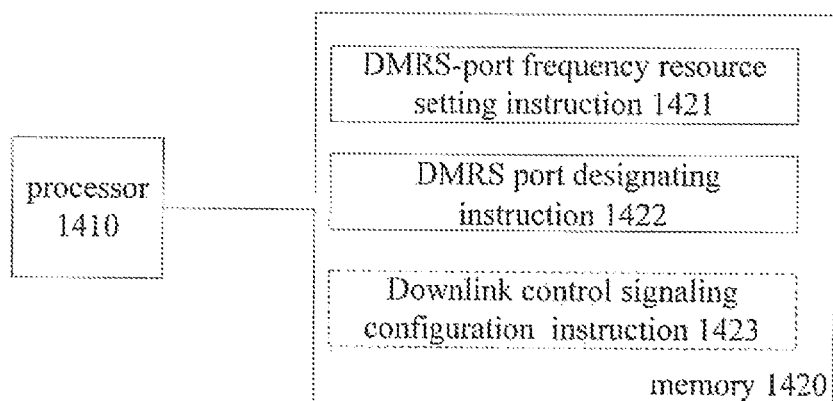
FIG. 14 is a schematic diagram illustrating a structure of a base station according to another example of the present disclosure.

FIG. 14 is a schematic diagram illustrating a structure of a base station according to another example of the present disclosure. As shown in FIG. 14, the base station comprises a processor 1410 and a memory 1420 communicated with the processor 1410; in the memory 1420, instructions that are executed by the processor 1410 are stored, comprising a DMRS-port frequency resource setting instruction 1421 and a DMRS port designating instruction 1422.

The DMRS-port frequency resource setting instruction 1421 indicates to re-allocate frequency resources of a DMRS port which are allocated to N first data flows to M second data flows, wherein M is greater than N, the N first data flows are used by N first UEs or less than N first UEs.

The DMRS port designating instruction 1422 indicates to designate a DMRS port for K second UEs involved in joint scheduling according to the re-allocation result of frequency resources of a DMRS port, and send information of the designated DMRS port via a downlink control signaling to the K second UEs, where K is lower than M or equal to M.

In an example, the DMRS-port frequency resource setting instruction indicates to allocate frequency resources of N DMRS ports in at least one resource block uniformly to w*N DMRS ports, wherein w is an integer greater than 1, and M=w*N.

In an example, the instructions further comprise a downlink control signaling configuration instruction 1423. The downlink control signaling configuration instruction 1423 indicates to carry an antenna port indicator which comprises more than 3 bits in the downlink control signaling.

Operations indicated by these instructions are similar to the above-described corresponding modules, which are not described in detail herein.

In practical application, a high-order MU-MIMO is suitable for densely deployed small cells with a relatively small cell radius, a low transmission power, and a small Root Mean Square (RMS) delay spread of the channel. The RMS delay spread caused by transmission characteristics of a high frequency may also be small. In the channel scenario with a small RMS delay spread, the system may reduce density of DMRS ports in the frequency domain, so that the number of DMRS ports can be extended for the high-order MU-MIMO, accordingly the order of MU-MIMO is also enhanced. According to examples of the present disclosure, the capability to support more users in the MU-MIMO system is enhanced, at most 24 UEs may be supported at the same time, so that the cell average capacity and cell-edge user frequency efficiency are also enhanced.

The foregoing is preferred examples of the present disclosure, which is not used for limiting the protection scope of the present disclosure. Any modifications, equivalent substitutions and improvements made within the spirit and principle of the present disclosure, should be covered by the protection scope of the present disclosure.

What is claimed is:

1. A method for Multiple User-Multiple Input Multiple Output (MU-MIMO) transmission in a wireless communication system, comprising:

re-allocating, by a base station, frequency resources of N DeModulation Reference Signal (DMRS) ports which are allocated to N first data flows uniformly to w*N DMRS ports which are allocated to M second data flows in an alternated manner across RBs, wherein the w*N DMRS ports uniformly occupies the frequency resources of the N DMRS ports alternately in turn, wherein the N first data flows are used by N first UEs or less than N first UEs, the M second data flows are used by K second UEs involved in joint scheduling or less than K second UEs, w is an integer larger than 1, and M=w*N; and designating, by the base station, a DMRS port for each of the K second UEs according to w*N DMRS ports, and sending information of the designated DMRS port via a downlink control signaling to each of the K second UEs, where K is lower than M or equal to M.

2. The method of claim 1, wherein sending information of the designated DMRS port via the downlink control signaling to each of the K second UEs comprises:

carrying an antenna port indicator which comprises more than 3 bits in the downlink control signaling to indicate each of the K second UEs the designated DMRS port.

3. The method of claim 2, wherein the antenna port indicator comprises 4 bits, or 5 bits, or 6 bits.

4. The method of claim 1, further comprising:
adding a wideband mode indicator in the downlink control signaling to indicate each of the K second UEs a resource allocation mode, wherein the resource allocation mode is selected from a subband scheduling mode, a broadband scheduling mode, and a fullband scheduling mode;
wherein for the subband scheduling mode, resources are allocated in unit of subband; for the broadband scheduling mode, resources are allocated in unit of broadband; for the fullband scheduling mode, resources are allocated in unit of entire frequency resources.

5. The method of claim 4, wherein the downlink control signaling is a Downlink Control Information (DCI) signaling.

6. The method of claim 5, wherein when the resource allocation mode indicated by the base station is the fullband scheduling mode, a resource allocation header field and a resource block allocation field in the DCI are turned off.

7. The method of claim 5, wherein when the resource allocation mode indicated by the base station is the broadband scheduling mode, a resource block allocation field in the DCI is configured according to $N_{RBG} = \lceil N_{RB}^{DL}/P \rceil$;
wherein $N_{RBG}$ denotes bit number of the resource block allocation field, $N_{RB}^{DL}$ denotes number of resource blocks corresponding to system bandwidth, P denotes length of a resource block group (RBG), $\lceil . \rceil$ stands for rounding up to the nearest integer, a relationship between $N_{RB}^{DL}$ and P is given in the following table:

| $N_{RB}^{DL}$ | P |
|---|---|
| ≤10 | 2 |
| 11-26 | 4 |
| 27-63 | 6 |
| 64-110 | 8. |

8. The method of claim 7, further comprising:
informing each of the K second UEs of the length of RBG via a Radio Resource Control (RRC) signaling.

9. The method of claim 5, wherein when the resource allocation mode indicated by the base station is the broadband scheduling mode, a resource block allocation field in the DCI is configured according to $N_{RBG} \lfloor N_{RB}^{DL}/P \rfloor$;
wherein $N_{RBG}$ denotes bit number of the resource block allocation field, $N_{RB}^{DL}$ denotes number of resource blocks corresponding to system bandwidth, P denotes length of a Resource Block Group (RBG), $\lceil . \rceil$ stands for rounding up to the nearest integer, a relationship between $N_{RB}^{DL}$ and P is given in the following table:

| $N_{RB}^{DL}$ | P |
|---|---|
| ≤10 | 3 |
| 11-26 | 6 |
| 27-63 | 9 |
| 64-110 | 12. |

10. The method of claim 9, further comprising:
informing each of the K second UEs of the length of RBG via a Radio Resource Control (RRC) signaling.

11. A base station in a wireless communication system, comprising:
a DeModulation Reference Signal (DMRS)-port frequency resource setting module, configured to re-allocate frequency resources of N DMRS ports which are allocated to N first data flows uniformly to w*N DMRS ports which are allocated to M second data flows in an alternated manner across Resource Blocks (RBs), wherein the w*N DRMS ports uniformly occupies the frequency resources of the N DMRS ports alternately in turn, and the N first data flows are used by N first UEs or less than N first UEs, the M second data flows are used by K second UEs involved in joint scheduling or less than K second UEs, w is an integer larger than 1, and M=w*N; and
a DMRS port designating module, configured to designate a DMRS port for each of the K second UEs according to the w*N DMRS ports, and send information of the designated DMRS port via a downlink control signaling to each of the K second UEs, where K is lower than M or equal to M.

12. The base station of claim 11, further comprising:
a downlink control signaling configuration module, configured to carry an antenna port indicator which comprises more than 3 bits in the downlink control signaling to indicate each of the K second UEs the designated DMRS port.

13. The base station of claim 12, wherein the downlink control signaling configuration module is further configured to: add a wideband mode indicator in the downlink control signaling to indicate each of the K second UEs a resource allocation mode, wherein the resource allocation mode is selected from a subband scheduling mode, a broadband scheduling mode, and a fullband scheduling mode;
wherein for the subband scheduling mode, resources are allocated in unit of subband; for the broadband scheduling mode, resources are allocated in unit of broadband; for the fullband scheduling mode, resources are allocated in unit of entire frequency resources.

14. A base station, comprising a processor and a memory communicated with the processor; wherein in the memory, instructions that are executed by the processor are stored, comprising a DMRS-port frequency resource setting instruction and a DMRS port designating instruction, wherein
the DMRS-port frequency resource setting instruction indicates to re-allocate frequency resources of N DMRS ports which are allocated to N first data flows uniformly to w*N DMRS ports which are allocated to M second data flows in an alternated manner across Resource Blocks (RBs), wherein the w*N DMRS ports uniformly occupies the frequency resources of the N DMRS ports alternately in turn, and the N first data flows are used by N first UEs or less than N first UEs, the M second data flows are used by K second UEs involved in joint scheduling or less than K second UEs, w is an integer larger than 1, and M=w*N;
the DMRS port designating instruction indicates to designate a DMRS port for each of the K second UEs according to the w*N DMRS ports, and send information of the designated DMRS port via a downlink control signaling to each of the K second UEs, where K is lower than M or equal to M.

15. The base station of claim 14, where the instructions further comprise a downlink control signaling configuration instruction, wherein the downlink control signaling configuration instruction indicates to carry an antenna port indicator which comprises more than 3 bits in the downlink control signaling to indicate each of the K second UEs the designated DMRS port.

* * * * *